Patented May 10, 1938

2,116,752

UNITED STATES PATENT OFFICE 2,116,752

METHOD OF PRESERVING BUTTERFLIES

Karl Deubel, Jersey City, N. J.

No Drawing. Application June 23, 1934, Serial No. 732,081. Renewed October 1, 1937

2 Claims. (Cl. 35—20)

This invention relates to a novel method of preserving the wings of butterflies and moths or other lepidopterous insects having their wings covered with minute beautifully colored or brilliant laminated scales, and it is the principal object of my invention to cover the wings preserved by a suitable compound with a transparent cover and a pliable backing allowing the manufacture of a great number of articles on which the original colors of the butterfly wings are displayed in their original beauty and color display.

It is well known that the wings of butterflies and the like insects are very brittle and that at the slightest touch the scales will come off and their natural beauty and color scheme are destroyed, and it is by the use of my novel method hereafter to be more fully described, that such conservation and preservation of the wings is effected.

Another object of my invention is the method of pasting or cementing the suitably prepared wings of butterflies or the like insects, to any kind of material, for instance flexible material and to cover the wings by a transparent cover so that they may be bent or folded without injury to the wings or scales on the same and without destroying the natural coloring of the same.

A further object of my invention is the provision of a method of preparing butterflies to make them adapted for use in the manufacture of pocketbooks, pictures, hat ornaments, for ornamental purposes, in the manufacture of inlaid furniture, automobile trimmings, for display on greeting cards and for many other purposes too numerous to mention specifically.

These and other objects of my invention will become more fully known as the description thereof proceeds and will then be specifically defined in the appended claims.

With the above and other objects in view I make use of a composition or compound especially well adapted for use with my method and consisting of gum, such as gum arabic and gum acacia, a colloid, such as for instance gelatine, a triatomic alcohol such as for instance glycerin, and a phenol, such as for instance salicylic acid. I use these ingredients preferably in the following proportions, 10 ounces of gum arabic, 10 ounces of gum acacia, 1 ounce of gelatine, 2 ounces of glycerin and ¼ gram of salicylic acid dissolved in a sufficient quantity of water.

Before use this composition is suitably heated and then applied to preserve the wings of butterflies and the like and to cement and laminate the wings of butterflies and moths or other insects to the rear or inner face of a suitable transparent or semi-transparent material such as for instance Celluloid, Cellophane, oiled silk, paper, glass or the like through which the color of the wings and the design and pattern thereof will remain visible or I may use any suitable chemical composition which will form a transparent coat or cover for the wings.

As a base or background for the reverse side of the laminated wings I may use any kind of material, such as felt, cloth, leather, Celluloid, Cellophane, glass, cardboard paper, wood, etc., or any chemical composition forming a durable coat or cover, which may be flexible or elastic, or not.

I may also use as a covering for the preserved wings clear lacquer, varnish or the like which when dry will form a coating through which the wings are clearly visible.

Furthermore, I may suitably dye or tint the wings, if desired in any required color shade.

It will be clear that wings thus preserved and mounted on suitable material may be used for decorating or embellishing numerous articles, or to form pictures, and find ready use in the manufacture of numerous articles.

It will be understood that I have disclosed the preferred form of my composition, method of making and using the same, and that I may make such changes in the ingredients, proportion and manner of combining the same, as well as in making use of the same as come within the scope of the appended claims without departure from the spirit of my invention and the principles involved.

Having thus described my invention what I claim as new and desire to secure by Letters Patent is:

1. A method of preserving the beauty and design of butterfly wings consisting in coating the wings on their front face with clear lacquer not obscuring or marring the natural beauty of the wings, and on their rear face with a compound composed of gum arabic, gum acacia, gelatine, glycerin, salicylic acid and water to cement the wings to a background, and covering the wings at their front with a transparent cover through which the natural color and design becomes visible and finally mounting the cover on the background projecting with its rim beyond the edges of the butterfly design.

2. A method of preserving the beauty and design of butterfly wings assembled to present certain designs, consisting in coating the wings with a composition of gum arabic, gum acacia, gelatine, glycerin and salicylic acid dissolved in water, pasting the wings thus preserved with their rear sides to a cover of flexible material, varnishing the front faces of the preserved wings with a clear lacquer not obscuring the preserved natural beauty of the wings, placing a transparent cover thereover, and attaching the edges of said transparent cover to the edges of the cover of flexible material projecting beyond the design formed by the assembled wings.

KARL DEUBEL.